United States Patent [19]

Czech et al.

[11] Patent Number: 5,084,348
[45] Date of Patent: Jan. 28, 1992

[54] WATER-SOLUBLE, PRESSURE-SENSITIVE ADHESIVE MASSES SPLICE TAPES

[75] Inventors: Zbigniew Czech, Koblenz; Jorg Wehmann, Hardent, both of Fed. Rep. of Germany

[73] Assignee: Lohmann GmbH & Co. KG, Neuwied, Fed. Rep. of Germany

[21] Appl. No.: 463,749

[22] Filed: Jan. 12, 1990

[30] Foreign Application Priority Data

Jan. 21, 1989 [DE] Fed. Rep. of Germany ....... 3901690

[51] Int. Cl.$^5$ .............................. B32B 7/12; C09J 4/00
[52] U.S. Cl. .................................... 428/355; 524/377; 524/378; 428/356; 428/514
[58] Field of Search .................. 524/377, 378; 428/355

[56] References Cited

U.S. PATENT DOCUMENTS

| | | | |
|---|---|---|---|
| 3,865,770 | 2/1975 | Blake | 524/561 X |
| 4,140,115 | 2/1979 | Schonfeld | 428/411.1 |
| 4,388,432 | 6/1983 | Eskay | 524/388 |
| 4,413,080 | 11/1983 | Blake | 524/272 X |
| 4,668,730 | 5/1987 | Iovine et al. | 428/511 X |
| 4,759,983 | 7/1988 | Kuntson et al. | 428/349 X |
| 4,810,523 | 3/1989 | Williams et al. | 522/4 X |

FOREIGN PATENT DOCUMENTS

| | | |
|---|---|---|
| 81846 | 12/1982 | European Pat. Off. |
| 141504 | 9/1983 | European Pat. Off. |

Primary Examiner—George F. Lesmes
Assistant Examiner—D. R. Zirker
Attorney, Agent, or Firm—Sprung Horn Kramer & Woods

[57] ABSTRACT

An adhesive composition and accompanying tape wherein the adhesive is a water-soluble, pressure-sensitive adhesive mass consisting of a) 100 parts by weight of at least one water-soluble copolymer of 55 to 90%-wt of at least one vinylcarbonic acid, 5 to 35%-wt of at least one hydroxyalkyl (meth-) acrylate, 1 to 15%-wt of at least one N-substituted (meth-)- acrylamide derivative of the formula

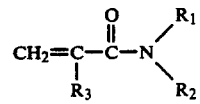

in which $R_1$ and $R_2$ are the same or different and can represent an alkyl wherein one of $R_1$ and $R_2$ can also be a hydrogen atom, and $R_3$ is a hydrogen atom or a methyl group, and 0.05 to 10%-wt of at least one vinylcarbonic acid salt, b) 50 to 200 parts by weight of at least one water-soluble softener including a polyoxyalkylene group having a molecular mass of up to 1000 and b) 0.1 to 8 parts by weight of a cross-linking agent.

8 Claims, No Drawings

WATER-SOLUBLE, PRESSURE-SENSITIVE ADHESIVE MASSES SPLICE TAPES

DESCRIPTION

The present invention relates to water-soluble, pressure-sensitive adhesive masses which, after coating and drying as self-adhesive films in addition to excellent continuous thermal resistance exhibit a high adhesion to paper and other moist substrates, and to their use for the production of splice tapes having a continuous temperature-resistance and adherence to moist substrates.

The known water-soluble, pressure-sensitive adhesive masses are, amongst others, also used for the production of water-dispersible splice tapes, and are described in the following letters patents:

- U.S. Pat. No. 2,838,421 mixture of polyacrylic acid and polyethylene glycol or polypropylene glycol,
- U.S. Pat. No. 3,321,451 copolymer based on acrylic esters and aminogroups containing methacrylates,
- DE-C 21 42 770 mixture of acrylic ester copolymers, ethoxylated polyvinyl alcohol, polyvinyl methyl ether and polyvinylpyrrolidone,
- DE-C 22 36 575 polyvinyl ether dispersions,
- U.S. Pat. No. 3,865,770 acrylic acid/acrylic ester copolymers neutralized with alcanolamines under addition of softening polyoxyethylene compounds,
- DE-C 23 11 746 vinyl methyl ether/maleic acid copolymers mixed with an alkylphenoxy polyglycol ether and unreacted alkylphenoxy polyglycol ethers as softeners,
- DE-C 29 04 233 and
- EP-B 0 058 382 acrylic ester/acrylic acid copolymers neutralized with tertiary ethoxylated N-alkylalkane diamines and alkalis,
- EP-B 0 081 846 acrylic acid/optionally acrylic ester/acrylamide copolymers mixed with multivalent tackifying alcohols and alkalis,
- U.S. Pat. No. 4,413,080 carboxyl group containing copolymers on the basis of isooctyl acrylate/butylacrylate mixed with water-soluble polyoxyethylene derivatives and tall resin tackifiers,
- U.S. Pat. No. 4,442,258 alkoxyalkyl acrylate/N-alkylamino acrylate copolymers mixed with water-soluble polyether or polyalcohol derivatives,
- EP-B 0 141 504 carboxyl group containing copolymers on the basis of isooctyl acrylate/butylacrylate mixed with phosphoric acid esters and OH-functional ethoxylated softeners,
- EP-B 0 147 067 water-soluble, pressure-sensitive adhesive masses on the basis of 2-ethylhexyl acrylate, methacrylic acid and hydroxyl group-containing (meth)acrylates,
- U.S. Pat. No. 4,518,745 water-soluble, pressure-sensitive adhesive masses built up of vinyl phosphonic acid, acryl or methacrylamide, vinyl sulfonic acid and vinyl phosphonic acid esters,
- DE-C 34 23 446 water-soluble terpolymers on the basis of N-vinyllactams N-vinyl acid amides, acrylic acid(salts) and alkyl vinyl ethers,
- DE-A 38 25 527 water-soluble, pressure-sensitive adhesive masses on the basis of β-acryloyloxypropionic acid.

The water-soluble, pressure-sensitive adhesive masses used up to now exhibit various disadvantages which limit their commercial use. The deficiencies of these products lie in the fact that the known water-soluble pressure-sensitive adhesive masses do not exhibit long-term high-temperature-resistance, and that their water-solubility decreases drastically after a thermal load. Such pressure-sensitive adhesive masses do not adhere to moist paper and other moist substrates. This also applies to the products according to EP-B 0 081 846, which are the closest prior art.

Thus it is the object of the present invention to synthesize a water-soluble, pressure-sensitive adhesive mass which does not exhibit the disadvantages mentioned hereinbefore, and which particularly, in addition to an excellent continuous heat-resistance, exhibits a good adhesion to moist materials and a sufficient water-solublity at the same time.

According to the present invention this object is achieved by means of water-soluble, pressure-sensitive adhesive masses which are built up by vinylcarbonic acid, hydroxyl(meth)acrylate, N-substituted (meth)-acrylamide, and vinylcarbonic acid salts.

Thus, the subject matter of the present invention are water-soluble, pressure-sensitive adhesive masses consisting of the following components:

a) 100 parts by weight of at least one water-soluble copolymer of

| | |
|---|---|
| 55 to 90% wt | of at least one vinylcarbonic acid |
| 5 to 35% wt | of at least one hydroxyl group- containing (meth-)acrylate |
| 1 to 15% wt | of at least one N-substituted (meth-)-acrylamide derivative and |
| 0.05 to 10% wt | of at least one vinylcarbonic acid salt, | b) 50 to 200 parts by weight of at least one water-soluble softener including a polyoxyalkylene group having a molecular mass of up to 1000 and c) 0.1 to 8 parts by weight of a cross-linking agent.

Preferred vinylcarbonic acids for the water-soluble copolymer a) are (meth-)acrylic acid, β-acryloyloxypropionic acid, vinylacetic acid, fumaric acid, crotonic acid, aconitic acid, or itaconic acid alone or mixed with one another. (Meth-)acrylic acid and β-acryloyloxypropionic acid are particularly preferred.

As hydroxyl group-containing (meth-)acrylates, i.e. esters of the (meth-)acrylic acid, hydroxyalkyl(meth-)acrylates are preferred, particularly 2-hydroxyethyl(meth-)acrylate, 2-hydroxypropyl(meth)-acrylate, or 4-hydroxybutyl(meth)acrylate which may be employed alone or in admixture with one another.

As N-substituted (meth-)acrylamide derivatives those of the general formula:

$$CH_2=C-\overset{O}{\overset{\|}{C}}-N\overset{R_1}{\underset{R_2}{\diagup}}$$
$$\underset{R_3}{|}$$

are preferred in which formula $R_1$ and $R_2$ are the same or different and can represent an alkyl-, which preferably has 1-8 carbon atoms, aryl-, preferably phenyl or naphthyl, arylalkyl-, alkyl-aryl-, hydroxyalkyl-, alkoxyalkyl-, alkoxyaryl-, carboxylaryl, carboxylaryl-, acetylalkyl-, or an acetylalkoxyalkyl group, wherein $R_1$ and $R_2$ can also be a hydrogen atom, and $R_3$ a hydrogen atom or a methyl group.

The vinylcarbonic acid salts which are used for the production of the water-soluble copolymer a) preferably are metal salts, particularly alkalimetal salts and/or ammonium salts of the above stated vinylcarbonic acids; the salts of (meth-)acrylic acid and β-acryloyloxypropionic acid are particularly preferred. As metal salts particulary the salts of lithium, sodium and/or potassium are referred.

As water-soluble softener b) the polyoxyalkylenes having a molecular mass of less than 1000 are preferred, for example, polypropylene glycol, polyethylene glycol, polyoxypropylene/polyoxyethylene copolymer, monoethylene glycol dimethyl ether, or polyethylene glycol dimethyl ether. These polyoxyalkylenes may be used alone or in combination with one another.

The cross-linking agent c) preferably consists of either at least one metal chelate, one metallic acid ester, one epoxide, one aziridine, one triazine, or a melamine formaldehyde resin.

Particularly preferred as cross-linking agents are the metal chelates, particularly those of the transistion metals, such as titanium and zirconium, e.g., with acetyl acetone.

The water-soluble, pressure-sensitive adhesive mass according to the present invention is produced, according to a preferred production method, by radical polymerisation of the components required for the production of the copolymer a) in an organic solvent, whereby after polymerization the water-soluble softeners and the cross-linking agents are added. As organic solvents acetone, benzine having boiling limits of 60/95 or 80/110, toluene, isopropyl alcohol, propyl alcohol, butyl alcohol, isobutyl alcohol, ethylacetate, and/or mixtures of these solvents are suitable.

The pressure-sensitive adhesive mass thus obtained is then applied to a carrier foil, dried at temperatures of about 100° C., and can then be processed to a splice tape by lamination on an adequate base.

Thus the present invention also relates to the use of the pressure-sensitive adhesive masses according to the invention for the production of splice tapes which exhibit continuous temperature-resistance and adhesion to moist substrates.

The following examples illustrate the invention but are not construed as limiting:

EXAMPLE 1

In a 1l three-neck flask provided with a stirrer, reflux condenser, thermometer, and dropping funnel, 100 g acetone and 100 g butanol-1 are placed and brought to the boil by means of an electrically heated oil bath under stirring. A monomer mixture of 112 g acrylic acid, 60 g 4-hydroxybutyl acrylate, 20 g N-methylol acrylamide, and 6 g of a 84% aqueous sodium acrylate were added to said solvent mixture within a period of 3 hours. The added monomer mixture contains 2.0 AIBN. After 4 hours, the polymerization is terminated. The finished polymer ($\eta = 12.5$ Pas) is diluted with isopropyl alcohol to a solid content of 40%-wt and then mixed with 90%-wt polypropylene glycol 400 and 1.5%-wt zirconium acetylacetonate (relative to the total copolyacrylate mass). The pressure-sensitive adhesive mass thus obtained is applied to a siliconized polyester foil, dried in the drying channel at 115° C., and subsequently applied by lamination to tea filter paper on both sides.

EXAMPLES 2 to 18

According to the formula of example 1 the starting monomers listed in table 1 (indications given in parts by weight) were polymerized and subsequently mixed with water-soluble softeners and adequate cross-linking agents.

TABLE 1

| Example | Vinyl carbonic acid | | | Hydroxyl groups containing (meth)acrylate | | | N-substituted (meth)acrylamide | | |
|---|---|---|---|---|---|---|---|---|---|
| | AS | APS | MAS | HEA | HBA | HPMA | NMA | MAGME | IBMA |
| 2 | 70 | — | — | 10 | — | — | — | — | 12 |
| 3 | 70 | 10 | — | — | 10 | — | 8 | — | — |
| 4 | 65 | 5 | 5 | 10 | — | 5 | — | — | 6 |
| 5 | — | 80 | — | — | — | 10 | 5 | — | — |
| 6 | 75 | 6 | — | — | 5 | — | — | 4 | 6 |
| 7 | 40 | 40 | — | 5 | — | 5 | — | — | 7 |
| 8 | — | — | 80 | 15 | — | — | 4 | — | — |
| 9 | — | 60 | — | — | — | 20 | — | — | 12 |
| 10 | 75 | — | — | — | 5 | 10 | 1 | — | — |
| 11 | 60 | — | — | — | — | 25 | — | — | 10 |
| 12 | 70 | 10 | — | 10 | — | — | 8 | — | — |
| 13 | 60 | 18 | — | 5 | 5 | — | 2 | 5 | — |
| 14 | 70 | — | — | 5 | 10 | 9 | — | 3 | — |
| 15 | 55 | 25 | — | — | — | 10 | — | — | 6 |
| 16 | 40 | 20 | 15 | — | 5 | 8 | 4 | — | 4 |
| 17 | 80 | 10 | — | — | — | 5 | 4 | — | — |
| 18 | 65 | — | — | — | — | 25 | — | — | 7 |

| Example | Metallic salt of vinyl-carbonic acid | | | Water-soluble softener | | | Cross-linking agent | | |
|---|---|---|---|---|---|---|---|---|---|
| | NaA | NaAPS | KA | PPG | PEGDM | PG | ZrACA | BT | MFH |
| 2 | 3 | — | — | 100 | — | — | 1.5 | — | — |
| 3 | — | 2 | — | 90 | — | — | — | 0.8 | — |
| 4 | — | 4 | — | — | 100 | — | — | — | 5.0 |
| 5 | 5 | — | — | — | — | 75 | 0.9 | — | — |
| 6 | 3 | — | 1 | 160 | — | — | 4.5 | — | — |
| 7 | 3 | — | — | 120 | — | — | — | 1.2 | — |
| 8 | — | 1 | — | — | — | 150 | — | — | 7.0 |
| 9 | — | 8 | — | — | 120 | — | 3.0 | — | — |
| 10 | 9 | — | — | — | 140 | — | 3.5 | — | — |
| 11 | 3 | 2 | — | 85 | — | — | — | 0.7 | — |
| 12 | — | — | 2 | 150 | — | — | — | 1.8 | — |
| 13 | 5 | — | — | — | 110 | — | 2.5 | — | 3.5 |
| 14 | — | 2 | 1 | — | — | 95 | — | — | 2.5 |
| 15 | 4 | — | — | 140 | — | — | 4.0 | — | — |

TABLE 1-continued

| 16 | 2 | 2 | — | 130 | — | — | — | 1.8 | — |
| 17 | 1 | — | — | — | — | 160 | 5.0 | — | — |
| 18 | — | 3 | — | 110 | — | — | — | 1.5 | — |

List of abbreviations used:
AS Acrylic acid
APS β-acryloyloxypropionic acid
MAS Methacrylic acid
HEA 2-hydroxyethyl acrylate
HBA 4-hydroxybutyl acrylate
HPMA 2-hydroxypropyl methacrylate
NMA N-methylol acrylamide
MAGME Methyl acrylamido glycolate methyl ether
IBMA Isobutoxy methyl acrylamide
NaA Sodium acrylate
NaAPS Sodium-β-acryloyloxypropionate
KA Potassium acrylate
PPG 400 Polypropylene glycol having a molecular mass of 400
PEGDM 500 Polyethylene glycol dimethyl ether having a molecular mass of 500
PG Polyglycol having a molecular mass of 600
ZrACA Zirconium acetylacetonate
BT Butyltitanate
MFH Melamine formaldehyde resin The values of the water-soluble splice tapes obtained in this manner are listed in table 2.

TABLE 2

| Example | Adhesive force (steel) (acc. AFERA 4015) [N] | | | | | Adhesive force (paper) (acc. AFERA 4001) [N] | Tack (steel) (acc. AFERA 4015) [N] | Dynamic shear strength (silicone paper) [N] | Water-solubility | | |
|---|---|---|---|---|---|---|---|---|---|---|---|
| | 20° C. | 70° C. | 120° C. | 150° C. | 200° C. | 20° C. | 20° C. | 200° C. | pH = 4 | pH = 7 | pH = 12 |
| 2 | 20.5 | 6.5 | 7.5 AB | 7 AB | 4.5 AB | 11.5 | 3.5 | 30–40 | sol. | sol. | soluble |
| 3 | 19 | 6 | 6.5 AB | 5.5 AB | 4 AB | 11 | 3 | 30–35 | " | " | " |
| 4 | 18 | 6 | 5.5 AB | 4.5 AB | 3.5 AB | 12 | 3.5 | 35–40 | " | " | " |
| 5 | 22 | 9 | 6 AB | 4.5 AB | 3 AB | 11.5 | 4 | 20–30 | " | " | " |
| 6 | 21 | 11 | 9 AB | 5 AB | 4 AB | 13.5 | 3.5 | 30–40 | " | " | " |
| 7 | 20 | 8.5 | 6.5 AB | 6 AB | 3.5 AB | 13 | 4 | 35–45 | " | " | " |
| 8 | 14 | 5 | 3.5 AB | 3 AB | 2.5 AB | 10 | 2.5 | 18–28 | " | " | " |
| 9 | 23 | 12 | 5.5 AB | 3.5 AB | 3 AB | 15 | 4.5 | 25–35 | " | " | " |
| 10 | 22 | 13 | 9.5 AB | 6 AB | 4 AB | 16 | 5.5 | 40–60 | " | " | " |
| 11 | 19 | 12 | 10 AB | 6 AB | 3.5 AB | 13 | 3.5 | 55–70 | " | " | " |
| 12 | 24 | 11 | 8 AB | 7 AB | 4.5 AB | 18.5 | 4.5 | 50–70 | " | " | " |
| 13 | 20 | 10 | 7.5 AB | 6.5 AB | 2.5 AB | 17 | 3.5 | 40–65 | " | " | " |
| 14 | 18.5 | 9.5 | 6.5 AB | 5 AB | 3 AB | 14.5 | 3 | 25–40 | " | " | " |
| 15 | 19 | 10.5 | 8.5 AB | 4.5 AB | 2.5 AB | 18.5 | 4 | 40–55 | " | " | " |
| 16 | 16.5 | 10 | 8 AB | 6.5 AB | 3 AB | 13.5 | 3.5 | 25–35 | " | " | " |
| 17 | 26.5 | 13.5 | 10 AB | 8.5 AB | 5.5 AB | 20.5 | 4.5 | 60–82 | " | " | " |
| 18 | 20.5 | 12 | 10 AB | 8 AB | 6 AB | 14.5 | 3.5 | 35–50 | " | " | " |

AB = Adhesion break

COMPARISON EXAMPLE (ACCORDING TO EP 0 081 846)

A pressure-sensitive adhesive mass was produced of 95 parts by weight of acrylic acid and 5 parts by weight of acrylamide. As solvent a mixture of water and acetone (ratio 2:1) was used, as radical builder 0.6 part by weight of benzoyl peroxide was used. The reaction temperature amounted to 74° C., the solid content was 15%-wt. After a reaction time of 6 hours, the polymer was mixed with 1.7 parts by weight of NaOH and 200 parts by weight of polyethylene glycol monoethyl ether (mw=270), relative to 100 parts by weight of the polymer, then applied to a siliconized polyester foil, dried in the drying channel at 115° C. and laminated double-sided on tea filter paper.

Table 3 shows the comparison of a splice tape produced according to example 1 of the present invention (splice tape 1) with one commercially available (splice tape 2) and with that produced according to EP 0 081 846 (splice tape 3).

TABLE 3

Comparing examination of water-soluble splice tapes

| Properties | Splice tape 1 (produced acc. to example 1) | Splice tape 2 | Splice tape 3 (produced acc. to EP 0081846) |
|---|---|---|---|
| Adhesive force (steel) [N] | | | |
| 20° C. | 18.5 | 13 | 13 |
| 70° C. | 6.5 | carrier divides | carrier divides |
| Tack (steel) [N] | 6.5 | 2 | 4 |
| Dynamic shear strength [N] 150° C. | 50–72 AB | 50–76 CD | 16–18 CB |
| Water-solubility | | | |
| pH 12 | soluble | soluble | soluble |
| pH 7 | " | " | " |
| pH 4 | " | " | " |

AB—adhesion break
CB—cohesion break
CD—carrier divides

RESULT

All examined splice tape exhibit excellent water-solubility at different pH-values. The splice tape manufactured according to example 1 is superior to splice tapes 2 and 3 with respect to adhesive force and tack.

DYNAMIC SHEAR STRENGTH

Measured on raw silicone paper at 150° C. and 200° C. after rolling with 50N (adherend 400 mm²).

WATER-SOLUBILITY 1250 mm² splice tape is stirred in a refining device at 3000 rpm for 15 minutes in 150 ml water at 20° C., and the dissolution of the adhesive tape was evaluated visually.

It is understood that the specification and examples are illustrative but not limitative of the present invention and that other embodiments within the spirit and scope of the invention will suggest themselves to those skilled in the art.

We claim:

1. A water-soluble, pressure-sensitive adhesive mass consisting of
  a) 100 parts by weight of at least one water-soluble copolymer of 55 to 90%-wt of at least one vinylcarbonic acid 5 to 35%-wt of at least one hydroxyalkyl (meth-)acrylate 1 to 15%-wt of at least one N-substituted (meth-)acrylamide derivative of the formula

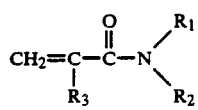

in which $R_1$ and $R_2$ are the same or different, and can represent an alkyl wherein one of $R_1$ and $R_2$ can also be a hydrogen atom, and $R_3$ is a hydrogen atom or a methyl group, and 0.05 to 10%-wt of at least one vinylcarbonic acid salt, b) 50 to 200 parts by weight of at least one water-soluble softener including a polyoxyalkylene group having a molecular mass of up to 1000 and
  c) 0.1 to 8 parts by weight of a cross-linking agent.

2. The water-soluble, pressure-sensitive adhesive mass according to claim 1, characterized in that the vinylcarbonic acid of copolymer a) is selected from the group consisting of (meth-)acrylic acid, β-acryloyloxypropionic acid, vinylacetic acid, fumaric acid, crotonic acid, aconitic acid, or itaconic acid, or mixtures of these acids.

3. The water-soluble, pressure-sensitive adhesive mass according to claim 1, characterized in that the vinylcarbonic acid salt of copolymer a) is a metal salt, or an ammonium salt.

4. The water-soluble, pressure-sensitive adhesive mass according to claim 1, characterized in that the water-soluble softener b) having a molecular mass below 1000 is a polyoxypropylene glycol, polyethylene glycol, polyoxypropylene/polyoxyethylene copolymer, monoethylene glycol dimethylether and/or polyethylene glycol dimethylether or a mixture of these compounds.

5. The water-soluble, pressure-sensitive adhesive mass according to claim 1, characterized in that the cross-linking agent is a metal chelate, a metallic acid ester, an epoxide, an aziridine, a triazine or a melamine formaldehyde resin.

6. The water-soluble, pressure-sensitive adhesive mass according to claim 1, characterized in that the hydroxyl groups containing (meth-)acrylate of copolymer a) is a 2-hydroxyethyl-hydroxyalkyl(meth-)acrylate.

7. The water-soluble, pressure-sensitive adhesive mass according to claim 1, characterized in that the vinylcarbonic acid salt of copolymer a) is an alkali salt or an ammonium salt.

8. In a splice tape having continuous temperature-resistance and adherence to moist substrates and including an adhesive mass, the improvement wherein such adhesive mass is a water-soluble pressure-sensitive adhesive mass according to claim 1.

* * * * *

UNITED STATES PATENT AND TRADEMARK OFFICE
CERTIFICATE OF CORRECTION

PATENT NO. : 5,084,348

DATED : January 28, 1992

INVENTOR(S) : Czech et al.

It is certified that error appears in the above-identified patent and that said Letters Patent is hereby corrected as shown below:

Title Page      ABSTRACT: Last line before " 0.1 " delete " b) " and substitute -- c) --

Col. 8, line 19    Delete " polyoxypropylene " and substitute -- polypropylene --

Signed and Sealed this

Twentieth Day of July, 1993

Attest:

MICHAEL K. KIRK

*Attesting Officer*      Acting Commissioner of Patents and Trademarks